US007014935B2

(12) United States Patent
Knights et al.

(10) Patent No.: US 7,014,935 B2
(45) Date of Patent: Mar. 21, 2006

(54) SOLID POLYMER ELECTROLYTE FUEL CELL STACK HAVING SPECIFIC CORROSION RESISTANT CELLS

(75) Inventors: Shanna D. Knights, Burnaby (CA); David P. Wilkinson, North Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 300 days.

(21) Appl. No.: 10/411,895

(22) Filed: Apr. 11, 2003

(65) Prior Publication Data

US 2004/0202909 A1    Oct. 14, 2004

(51) Int. Cl.
*H01M 8/10* (2006.01)
*H01M 4/86* (2006.01)
(52) U.S. Cl. .............................. 429/32; 429/42; 429/44
(58) Field of Classification Search .................. 429/32, 429/42, 44
See application file for complete search history.

(56) References Cited

U.S. PATENT DOCUMENTS

2001/0036568 A1   11/2001   Farkash et al. ............... 429/26
2002/0076582 A1    6/2002   Reiser et al. .................. 429/13
2002/0076583 A1    6/2002   Reiser et al. .................. 429/13

FOREIGN PATENT DOCUMENTS

| JP | 8-167424 | | 6/1996 |
| JP | 11-97053 | | 4/1999 |
| JP | 2002-184447 | | 6/2002 |
| WO | WO 00/02282 | | 1/2000 |
| WO | 01/15249 | * | 3/2001 |
| WO | 01/15254 | * | 3/2001 |
| WO | WO 01/15249 A2 | | 3/2001 |
| WO | WO 01/15254 A2 | | 3/2001 |
| WO | WO 01/15255 A2 | | 3/2001 |

* cited by examiner

*Primary Examiner*—Patrick Joseph Ryan
*Assistant Examiner*—Thomas H. Parsons
(74) *Attorney, Agent, or Firm*—Seed IP Law Group PLLC

(57) ABSTRACT

A solid polymer electrolyte fuel cell stack having a plurality of fuel cells, wherein at least one cell of the fuel cell stack has a resistance to corrosion that is greater than a significant portion of the other fuel cells of the stack. In one embodiment, the at least one fuel cell of the fuel cell stack that is more resistant to corrosion is one or both end cells of the stack. Also disclosed is a fuel cell system containing such a stack, as well as methods for reducing degradation of the same during operation.

19 Claims, 1 Drawing Sheet

SOLID POLYMER ELECTROLYTE FUEL CELL STACK HAVING SPECIFIC CORROSION RESISTANT CELLS

BACKGROUND OF THE INVENTION

1. Field of the Invention

This invention generally relates to a solid polymer electrolyte fuel cell stack wherein certain of the cells are more resistant to degradation and, more particularly, to stacks having end cells that are more resistant to degradation during operation.

2. Description of the Prior Art

Significant effort has been directed to the development of reliable fuel cell systems for use as power supplies in a wide variety of applications, such as stationary power plants and portable power units. Such systems offer the promise of economically delivering power while providing environmental benefits.

In general, fuel cells convert fuel and oxidant reactants to generate electric power and reaction products, and often employ an electrolyte disposed between cathode and anode electrodes. A catalyst typically induces the desired electrochemical reactions at the electrodes. A preferred fuel cell type, particularly for portable and motive applications, is the solid polymer electrolyte (SPE) fuel cell, which comprises a solid polymer electrolyte and operates at relatively low temperatures.

SPE fuel cells employ a membrane electrode assembly (MEA) which comprises the solid polymer electrolyte disposed between the cathode and anode electrodes. Each electrode contains a catalyst layer, comprising an appropriate catalyst, located next to the solid polymer electrolyte. The catalyst is typically a precious metal composition (e.g., platinum metal black or an alloy thereof) and may be provided on a suitable support (e.g., fine platinum particles supported on a carbon black support). The catalyst layers may contain ionomer similar to that used for the solid polymer membrane electrolyte (e.g., Nafione®). The electrodes may also contain a porous, electrically conductive substrate that provides mechanical support, electrical conduction, and/or reactant distribution, thus serving as a fluid diffusion layer. Flow field plates for directing the reactants across one surface of each electrode or electrode substrate, are disposed on each side of the MEA. In operation, the output voltage of an individual fuel cell under load is generally below one volt. Therefore, in order to provide greater output voltage, numerous cells are usually stacked together and are connected in series to create a higher voltage fuel cell stack.

During normal operation of a SPE fuel cell, fuel is electrochemically oxidized at the anode catalyst, typically resulting in the generation of protons, electrons, and possibly other species depending on the fuel employed. The protons are conducted from the reaction sites at which they are generated, through the solid polymer electrolyte, to electrochemically react with the oxidant at the cathode catalyst. The electrons travel through an external circuit providing useable power and then react with the protons and oxidant at the cathode catalyst to generate water as a reaction product.

However, other reactions can take place when abnormal conditions exist in a SPE fuel cell. For example, as disclosed in published PCT applications WO 01/15255, WO 01/15249 and WO 01/15254, electrolysis of water and/or corrosion of certain fuel cell components can occur when fuel cells undergo voltage reversal. Fuel starvation conditions can, for instance, lead to a voltage reversal situation in which the anode components are subject to corrosion. Various methods are disclosed in the above published applications to prevent or reduce such corrosion.

Generally, prior art methods have sought to prevent or reduce corrosion of all the fuel cells within the stack. An alternative strategy has been to sense or detect an adverse situation at a point in time such that remedial action can be taken. In published PCT application WO 00/02282, a sensor cell is specially designed to be sensitive to adverse conditions. Early detection is accomplished by monitoring the sensor cell and comparing it to other cells in the stack. Once detected, corrective action can be taken to address the adverse condition. Adverse conditions can also arise in a SPE fuel cell upon startup and shutdown. In published U.S. patent applications US2002/076582 and US2002/076583, conditions are disclosed that can lead to cathode corrosion during startup and shutdown. Such corrosion may be reduced by rapidly purging the anode flow field with an appropriate fluid.

In an SPE fuel cell stack containing a large number of individual cells, the condition of end cells in the stack (i.e., those cell or cells at or near an end of the stack) can be abnormal and different from the rest of the fuel cells within the stack because of differences in operating temperature. Heat loss to the surrounding environment by, for example, convection or conduction can make the end cell or cells cooler than those in the rest of the stack, which in turn can result in poor performance or premature failure of the end cell(s). An example of such a temperature difference is disclosed in published Japanese Patent Application JP08-167424, which also discloses the use of heating elements in the end collector plates of the fuel cell stack to compensate for the heat loss in the end cells. Similarly, published U.S. patent application US2001/0036568 also discloses the use of heatable elements to heat the end plate of a SPE fuel cell stack. In this published application, it is also noted that water may condense in colder end cells, causing flooding and leading to voltage reversal and degradation of materials in the fuel cell. While heating elements can be used to compensate for heat loss from the end cells, thereby allowing them to perform similarly to the rest of the cells in the stack, this approach requires additional hardware and complexity.

While significant advances have been made related to fuel cells generally, and to SPE fuel cell stacks specifically, there remains a need in the art for improved fuel cells, fuel cell stacks and related systems that are more resistant to degradation. The present invention fulfils these and other needs as set forth in greater detail below.

BRIEF SUMMARY OF THE INVENTION

In brief, this invention provides a solid polymer electrolyte fuel cell stack comprising a plurality of fuel cells, wherein at least one fuel cell of the fuel cell stack has a resistance to corrosion that is greater than a significant portion of the other fuel cells of the fuel cell stack. As used herein, the phrase "a significant portion" means more than half (50%) of the fuel cells of the fuel cell stack. Thus, the at least one fuel cell of the fuel cell stack has a resistance to corrosion that is greater than half of the fuel cells of the fuel cell stack.

In a more specific embodiment, the at least one fuel cell is at one or both ends of the fuel cell stack (also referred to herein as an "end fuel cell"). In addition, the term "end fuel cell" also encompasses fuel cells in close proximity to one or both ends of the fuel cell stack. In this regard, the phrase "close proximity" means those fuel cells near the end of the fuel cell stack that are subject to adverse conditions (albeit usually to a lesser extent than the end fuel cell), but which still benefit from increased corrosion resistance. Fuel cells within the interior of the fuel cell stack (i.e., between the two ends of the fuel cell stack) are referred to herein as "internal fuel cells". Accordingly, in this embodiment, one or both end fuel cell(s) has a resistance to corrosion that is greater than a significant portion of the internal fuel cells.

In still a more specific embodiment, the fuel cell(s) having greater resistance to corrosion may comprise a cathode that has greater resistance to corrosion, an anode that has greater resistance to corrosion, or both a cathode and an anode that have greater resistance to corrosion compared to the corresponding cathode, anode or both cathode and anode of the internal fuel cells.

The electrode of the fuel cell having greater resistance to corrosion may comprise an unsupported catalyst, while the internal fuel cells of the stack comprise a carbon supported catalyst. A representative unsupported catalyst is platinum black, while a suitable carbon supported catalyst is furnace black supported platinum.

The electrode in the fuel cell having greater resistance to corrosion may comprise polytetrafluoroethylene, while the internal fuel cells of the stack comprise perfluorosulfonic acid polymer.

The catalyst loading in the electrode of the fuel cell having greater resistance to corrosion may be greater than in the electrodes of the internal fuel cells of the stack. For example, the catalyst loading in the electrode of the fuel cell having greater resistance to corrosion may be greater than 1 $mg/cm^2$, while the catalyst loading in the electrodes of the internal fuel cells of the stack is less than 1 $mg/cm^2$.

In a still further embodiment, the fuel cell having greater resistance to corrosion is not a sensor cell and, in a further embodiment, is not associated with a monitor for monitoring an operating parameter of the fuel cell.

In another embodiment, the fuel cell system is disclosed wherein the fuel cell system comprises a fuel cell stack of this invention. Such a system may further include, in addition to the fuel cell stack, reactant and oxidant supply systems, sensors, actuators, control circuitry, and other components as known to those skilled in this field.

In yet another embodiment, a method is disclosed for reducing degradation of a solid polymer electrolyte fuel cell during operation, the method comprising the step of increasing the corrosion resistance of at least one cell to be greater than a significant portion of the other fuel cells in the fuel cell stack.

These and other aspects of this invention will be evident upon reference to the attached figures and following detailed description.

DETAILED DESCRIPTION OF THE INVENTION

As noted above, this invention provides a solid polymer electrolyte (SPE) fuel cell stack comprising a plurality of fuel cells, wherein at least one fuel cell of the fuel cell stack has a resistance to corrosion that is greater than a significant portion of the other fuel cells of the fuel cell stack.

In one embodiment, corrosion (and thus degradation) of one or more fuel cells of a SPE fuel cell stack is attributable to one or more low temperature cells, and particularly to corrosion of the electrodes of such cell(s). Degradation can be largely overcome if these cells are made sufficiently more resistant to corrosion. Since typically it is only certain end cells that need additional protection against corrosion, end cell construction may be employed that will not be practical or economic if required in all the cells in the stack. Certain stack constructions may also, however, result in a cell or cells in the interior of the stack experiencing lower temperature conditions compared to other cells in the stack. Such situations exist, for instance, when a support in the middle of a stack acts as a significant heat sink. In such a case, these lower temperature cells in the middle of the stack are made sufficiently resistant to corrosion compared to a significant portion of the other cells in the fuel cell stack.

In particular, the thermal conditions in typical SPE stack end cells may result in a partial fuel starvation which primarily leads to corrosion of the end cell cathodes (e.g., localized cathode corrosion occurs in areas opposite to a localized partial fuel starvation). In such stacks, employing more corrosion resistant cathodes in the affected end cells is sufficient to reduce the rate of degradation such that the affected end cells perform similarly to the rest of the cells in the stack.

The corrosion resistance of a fuel cell may be increased by employing a cathode or anode electrode that has greater resistance to corrosion compared to the other electrodes of the fuel cell stack. Various techniques may be used to increase the corrosion resistance of all or a portion of an electrode and are known to those skilled in the art. For instance, using an unsupported catalyst (e.g., platinum black) in the electrode instead of a carbon-supported catalyst (e.g., furnace black supported platinum) can increase corrosion resistance. Also, using polytetrafluoroethylene in the electrode layer instead of perfluorosulfonic acid polymer can increase corrosion resistance. Further, using a greater catalyst loading in the electrode (e.g., greater than 1 $mg/cm^2$ instead of less than 1 $mg/cm^2$) can also increase corrosion resistance. These and other methods for increasing corrosion resistance are disclosed in published PCT applications WO 01/15255, WO 01/15249 and WO 01/15254, which applications are hereby incorporated by reference in their entirety.

Figure 1:
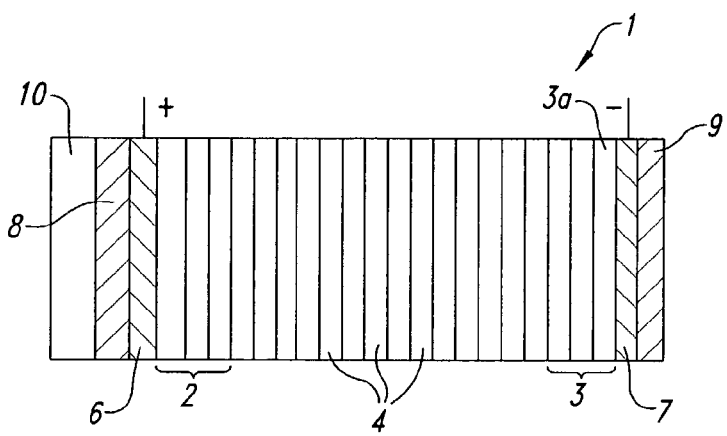
FIG. 1 shows a schematic diagram of a representative solid polymer electrolyte fuel cell stack of this invention.

FIG. 1 shows a schematic diagram of an SPE fuel cell stack. Stack 1 comprises a plurality of stacked cells including end cells 2 and end cells 3 at the positive and negative ends of stack 1, respectively. In between are a plurality of internal cells 4. Positive and negative bus plates 6 and 7 are provided at either end of the stacked cells and external power is obtained from terminals provided on bus plates 6 and 7. Compression plates 8 and 9 are also provided at either end of the stack to provide necessary compression to the stack components. A manifold assembly 10 is also shown in FIG. 1 at the positive end of stack 1. Manifold assembly 10 comprises ports and manifolds (not shown) suitable for supplying and exhausting the oxidant (typically air) and fuel (e.g., hydrogen) reactant streams to the cells in stack 1.

For the sake of illustration, the temperature condition of the single cell 3a at the negative end of stack 1 is at a significantly lower temperature than the rest of the stack during normal operation, and thus is more prone to degradation than the other cells in the rest of the stack. It should be noted that temperature differences of the order of 2° C.

are significant in this regard. Furthermore, manifold assembly 10 provides some insulation to end cells 2 at the positive end of stack 1, and thus end cells 2 are not at a significantly lower temperature than internal cells 4. While the preceding temperature conditions are noted for the sake of illustration, it should be understood that fuel cell stack constructions differ and, in other constructions, one or more of end cells 2 and/or end cells 3 and/or even certain internal cells 4 may be at a significantly lower temperature than internal cells 4, and hence more prone to degradation.

Still referring to FIG. 1, in order to prolong the life of the stack in accordance with the instant invention, the corrosion resistance of the more degradation prone end cell 3a is made greater than a significant portion of the other fuel cells in the stack. Thus, while the rest of the cells in the stack (i.e., end cells 2, internal cells 4 and any other end cells 3) may be of similar construction, end cell 3a has a different, more corrosion resistant construction.

In more specific embodiments, only certain components in end cell 3a, or even only portions of these components, need be more corrosion resistant. For instance, a condition that may arise in end cell 3a as a result of its lower thermal condition is partial fuel starvation. This would primarily lead to corrosion of the cathode of end cell 3a (localized cathode corrosion will typically occur in areas opposite to a localized partial fuel starvation). In such a case, employing a more corrosion resistant cathode in end cell 3a may be sufficient to reduce its degradation rate such that it performs similarly to the other cells in the stack. However, other adverse conditions may be experienced as well as, or instead of, a partial fuel starvation. For instance, a complete fuel starvation may occur, which primarily results in corrosion of the anode. In that case, the anode in end cell 3a may also be made more corrosion resistant.

Various modifications may be made to an electrode in end cell 3a in order to make it more corrosion resistant. For instance, carbon supported catalysts (e.g., furnace black supported platinum or platinum alloy) are typically employed in the electrodes of a conventional SPE fuel cell stack. However, an otherwise similar electrode that used unsupported catalyst instead (e.g., platinum black) is more corrosion resistant. Alternatively, more corrosion resistant supported catalysts may be obtained by using greater catalyst coverage on the surface of the support, or by using more robust carbons and/or other materials as the support. Further, a typical stack electrode may contain perfluorosulfonic acid polymer (similar to the electrolyte) in the catalyst layer. However, an otherwise similar electrode which employed polytetrafluoroethylene in the catalyst layer instead may be more corrosion resistant. Still further, a greater catalyst loading in the electrode would also render it more corrosion resistant (e.g., using a loading greater than 1 mg/cm$^2$ instead of the more typical less than 1 mg/cm$^2$ loading of a conventional electrode). Additionally, many more modifications may be made by one skilled in the art, such as those disclosed in published PCT applications WO 01/15255, WO 01/15249, and WO 01/15254 (each of which is hereby incorporated by reference in its entirety).

With the exception of the more corrosion resistant construction, such cell or cells may be operated in the same manner as the other fuel cells in the fuel cell stack, and need not be associated with any special monitoring or sensing device or purpose. In a more specific embodiment, such cells are not sensor cells and/or are not monitored for adverse conditions.

The following examples are provided to illustrate certain aspects and embodiments of the invention, and should not be construed as limiting in any way.

EXAMPLES

Three solid polymer electrolyte fuel cell stacks were fabricated with different cathode constructions in order to compare performance degradation, particularly in the degradation-prone end cell(s).

The stacks comprised 5 fuel cells stacked in series. The first cell in each stack was cooler than the rest during operation due to heat loss through manifolds and other hardware present at that end of the fuel cell stack. The arrangement of the electrodes was such that the anode in these first end cells faced outwards from the stack. In each cell in the stacks, the anode had a polytetrafluoroethylene (PTFE) impregnated carbon fiber paper substrate, with a sublayer on top that contained PTFE and Shawinigan black, a catalyst layer on top of the sublayer containing Pt/Ru catalyst supported on Vulcan carbon black, PTFE, and Shawinigan black, and finally a perfluorosulfonic acid ionomer coating on the catalyst layer. Each cell also employed NAFION® N112 perfluorosulfonic acid membrane electrolyte.

In the comparative stack, the cathode in each cell had a PTFE impregnated (6% by weight) carbon fiber paper substrate, a 0.6 mg/cm$^2$ sublayer on top that contained 6% PTFE and 94% Shawinigan black, a catalyst layer on top of the sublayer containing 77% by weight Pt catalyst supported on Vulcan carbon black (at 0.75 mg/cm$^2$ Pt loading), and 23% ionomer, and finally a 0.2 mg/cm$^2$ ionomer coating on the catalyst layer.

In the first, more corrosion resistant stack (denoted "Teflonated"), the cathodes were made in a similar manner to those in the comparative stack except that the catalyst layer contained 90% by weight Pt catalyst supported on Vulcan carbon black and 10% PTFE. Thus, this stack differed from the comparative stack in that the catalyst layer in the cathodes contained PTFE instead of ionomer.

In the second, more corrosion resistant stack (denoted "Teflonated Pt black"), the cathodes were made in a similar manner to those in the comparative stack except that the catalyst layer contained 90% by weight Pt catalyst black (at 1.3 mg/cm$^2$ Pt loading), and 10% PTFE. Thus, this stack differed from the comparative stack in that the catalyst layer in the cathodes contained PTFE instead of ionomer, Pt black instead of carbon supported Pt catalyst, and a greater total loading of Pt catalyst.

Each stack was then operated in a conventional manner for about 100 hours at low load. This involved supplying 100% RH hydrogen and air as reactants and drawing current at 0.1 A/cm$^2$ at an operating temperature of 70° C.

Figure 2:
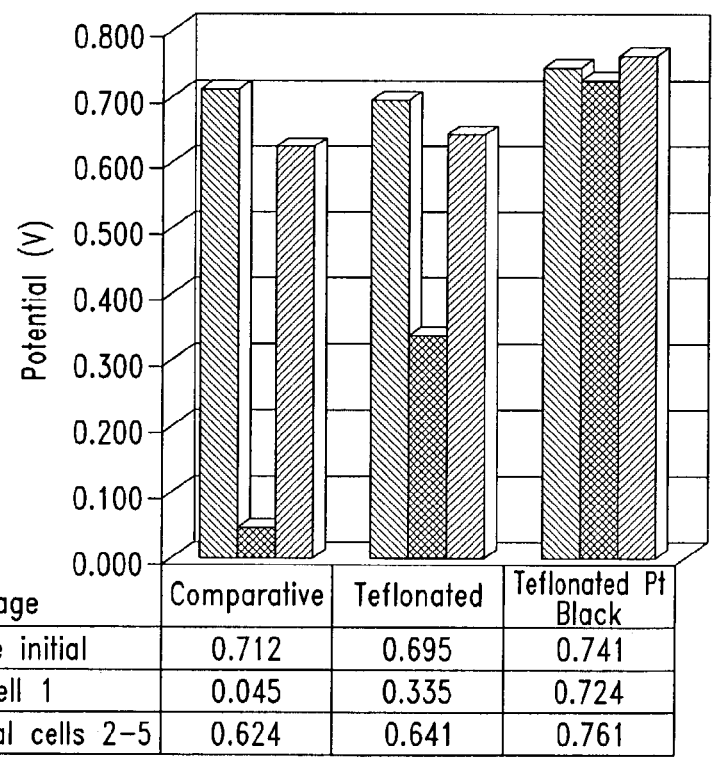
FIG. 2 shows a comparison of the degradation rates of specific fuel cells within various fuel cell stacks of the Examples.

FIG. 2 shows average initial cell voltages from these stacks and compares them to final cell voltages after operating for 100 hours. Drops in voltage are indicative of performance degradation. Shown in FIG. 2 are bars indicating the average initial cell voltage of all the cells in the stack, the final voltage of end cell #1 (the degradation prone cell), and the final average voltage of the rest of the cells in the stack (cells #2–5). As is evident from FIG. 2, after operating for 100 hours, end cell #1 in the comparative stack has degraded so much that less than 0.1 V is output at this low load. However, the other cells in the comparative stack have not degraded so much. In the "Teflonated" corrosion resistant stack, however, the performance of end cell #1 is substantially improved over that of the comparative cell after 100 hours of operation. The "Teflonated Pt black" corrosion resistant stack is even better still, showing little difference in degradation between end cell #1 and the rest of the cells in the stack. FIG. 2 demonstrates that end cell performance can degrade substantially more quickly than that of the rest of the cells in the stack. Further, this premature degradation can be remedied by incorporating suitable corrosion resistant cathodes in the end cell.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A solid polymer electrolyte fuel cell stack comprising a plurality of fuel cells, wherein at least one cell of the fuel cell stack comprises an electrode having a resistance to corrosion that is greater than the corresponding electrodes of a significant portion of the other fuel cells of the fuel cell stack.

2. The fuel cell stack of claim 1 wherein the at least one cell is at one or both ends of the fuel cell stack.

3. The fuel cell stack of claim 2 wherein the at least one cell is at one end of the fuel cell stack.

4. The fuel cell stack of claim 2 wherein the at least one cell is at both ends of the fuel cell stack.

5. The fuel cell stack of claim 1 wherein the at least one cell is one or more internal fuel cells.

6. The fuel cell stack of claim 1 wherein the electrode is a cathode.

7. The fuel cell stack of claim 1 wherein the electrode is an anode.

8. The fuel cell stack of claim 1 wherein the electrode comprises unsupported catalyst, and the corresponding electrodes of the significant portion of the other fuel cells comprise supported catalyst.

9. The fuel cell stack of claim 8 wherein the unsupported catalyst is platinum black.

10. The fuel cell stack of claim 8 wherein the supported catalyst is platinum supported on furnace black.

11. The fuel cell stack of claim 1 wherein the electrode comprises polytetrafluoroethylene, and the corresponding electrodes of the significant portion of the other fuel cells comprise perfluorosulfonic acid polymer.

12. The fuel cell stack of claim 1 wherein the electrode comprises increased catalyst loading compared to the corresponding electrodes of the significant portion of the other fuel cells.

13. The fuel cell stack of 12 wherein the catalyst loading of the electrode is greater than 1 $mg/cm^2$, and the catalyst loading of the corresponding electrodes of the significant portion of the other fuel cells is less than 1 $mg/cm^2$.

14. A fuel cell system comprising a fuel cell stack of claim 1.

15. The fuel cell system of claim 14 wherein the system does not monitor the at least one cell for an adverse condition.

16. A method of reducing degradation of a solid polymer electrolyte fuel cell stack during operation, the fuel cell stack having a plurality of fuel cells, the method comprising the step of increasing the corrosion resistance of at least one electrode of a fuel cell of the fuel cell stack to be greater than the corresponding electrodes of a significant portion of the other fuel cells of the fuel cell stack.

17. The method of claim 16 wherein the at least one fuel cell is one or both end fuel cells.

18. The method of claim 16 wherein the electrode is the cathode.

19. The method of claim 16 wherein the electrode is the anode.

* * * * *